United States Patent
Cho et al.

(10) Patent No.: US 11,685,685 B2
(45) Date of Patent: Jun. 27, 2023

(54) METHOD AND SYSTEM FOR COLD-FORMING GLASS

(71) Applicant: CORNING INCORPORATED, Corning, NY (US)

(72) Inventors: Dongyoung Cho, Cheongju-si (KR); Hyun-Soo Choi, Cheonan-si (KR); Ki-Nam Kim, Cheonan (KR); Shin Kim, Seocho-gu (KR)

(73) Assignee: Corning Incorporated, Corning, NY (US)

( * ) Notice: Subject to any disclaimer, the term of this patent is extended or adjusted under 35 U.S.C. 154(b) by 263 days.

(21) Appl. No.: 16/944,685

(22) Filed: Jul. 31, 2020

(65) Prior Publication Data

US 2021/0032150 A1    Feb. 4, 2021

Related U.S. Application Data

(60) Provisional application No. 62/880,820, filed on Jul. 31, 2019.

(51) Int. Cl.
| | |
|---|---|
| *C03B 9/36* | (2006.01) |
| *C03B 9/38* | (2006.01) |
| *C03B 17/04* | (2006.01) |
| *C03B 23/035* | (2006.01) |

(52) U.S. Cl.
CPC ................ *C03B 23/0357* (2013.01)

(58) Field of Classification Search
None
See application file for complete search history.

(56) References Cited

U.S. PATENT DOCUMENTS

| 2,068,030 A | 1/1937 | Lieser |
| 2,608,030 A | 8/1952 | Jendrisak |
| 3,197,903 A | 8/1965 | Walley |
| (Continued) | | |

FOREIGN PATENT DOCUMENTS

| CN | 1587132 A | 3/2005 |
| CN | 1860081 A | 11/2006 |
| (Continued) | | |

OTHER PUBLICATIONS

"Stainless Steel—Grade 410 (UNS S41000)", available online at <https://www.azom.com/article.aspx?ArticleID=970>, Oct. 23, 2001, 5 pages.

(Continued)

*Primary Examiner* — Alison L Hindenlang
*Assistant Examiner* — Steven S Lee

(57) ABSTRACT

Disclosed are embodiments of a method of forming a curved glass article. In the method, a mold having a curved surface is provided. A self-adhesive layer is disposed on the curved surface. A glass sheet is bent into conformity with the curved surface at a temperature less than the glass transition temperature of the glass sheet. The glass sheet includes a first major surface and a second major surface in which the second major surface is opposite to the first major surface. The first major surface is adhered to the self-adhesive layer. A frame is bonded to the second major surface of the glass sheet, and the glass sheet is removed from the self-adhesive layer. A system for performing the method and a mold having a self-adhesive layer are also disclosed.

11 Claims, 7 Drawing Sheets

(56) References Cited

U.S. PATENT DOCUMENTS

| | | |
|---|---|---|
| 3,338,696 A | 8/1967 | Dockerty |
| 3,582,456 A | 6/1971 | Stolki |
| 3,674,589 A * | 7/1972 | Schaab .................. B29C 33/68 156/289 |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |
| 3,799,817 A | 3/1974 | Laethem |
| 4,147,527 A | 4/1979 | Bystrov et al. |
| 4,238,265 A | 12/1980 | Deminet |
| 4,445,953 A | 5/1984 | Hawk |
| 4,455,338 A | 6/1984 | Henne |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,066,218 A * | 5/2000 | Kuhn ..................... B29C 65/48 156/87 |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,332,690 B1 | 12/2001 | Murofushi |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Dkahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 * | 5/2016 | Lee ..................... H05K 1/0306 |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,573,843 B2 | 2/2017 | Keegan et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,637,926 B2 * | 5/2017 | Kraus, Jr. ............... B29C 39/18 |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,963,374 B2 | 5/2018 | Jouanno et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Al et al. |
| 10,976,607 B2 | 4/2021 | Huang et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 * | 9/2007 | Franck .................... F24S 23/74 156/212 |
| 2007/0223121 A1 | 9/2007 | Franck et al. |

(56) References Cited

U.S. PATENT DOCUMENTS

| | | |
|---|---|---|
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | McFarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Jacques |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1* | 7/2018 | Kumar ............... B60R 13/02 |
| 2018/0188869 A1* | 7/2018 | Boggs ............... B60K 35/00 |
| 2018/0188869 A1* | 7/2018 | Boggs ............... B32B 17/06 |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |

(56) References Cited

U.S. PATENT DOCUMENTS

| | | |
|---|---|---|
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | | | |
|---|---|---|---|---|
| CN | 101600846 | A | 12/2009 | |
| CN | 101684032 | A | 3/2010 | |
| CN | 201989544 | U | 9/2011 | |
| CN | 102341356 | A | 2/2012 | |
| CN | 102464456 | A | 5/2012 | |
| CN | 102566841 | A | 7/2012 | |
| CN | 103136490 | A | 6/2013 | |
| CN | 103587161 | A | 2/2014 | |
| CN | 203825589 | U | 9/2014 | |
| CN | 204111583 | U | 1/2015 | |
| CN | 104656999 | A | 5/2015 | |
| CN | 104679341 | A | 6/2015 | |
| CN | 204463066 | U | 7/2015 | |
| CN | 104843976 | A | 8/2015 | |
| CN | 105118391 | A | 12/2015 | |
| CN | 105511127 | A | 4/2016 | |
| CN | 205239166 | U | 5/2016 | |
| CN | 105705330 | A | 6/2016 | |
| CN | 106256794 | A | 12/2016 | |
| CN | 205905907 | U | 1/2017 | |
| CN | 106458683 | A | 2/2017 | |
| CN | 206114596 | U | 4/2017 | |
| CN | 206114956 | U | 4/2017 | |
| CN | 107613809 | A | 1/2018 | |
| CN | 107757516 | A | 3/2018 | |
| CN | 108519831 | A | 9/2018 | |
| CN | 108550587 | A | 9/2018 | |
| CN | 108725350 | A | 11/2018 | |
| CN | 109070470 | A * | 12/2018 | ........... B29C 64/245 |
| CN | 109135605 | A | 1/2019 | |
| CN | 109690662 | A | 4/2019 | |
| CN | 109743421 | A | 5/2019 | |
| DE | 4415787 | A1 | 11/1995 | |
| DE | 4415878 | A1 | 11/1995 | |
| DE | 69703490 | T2 | 5/2001 | |
| DE | 102004022008 | A1 | 12/2004 | |
| DE | 102004002208 | A1 | 8/2005 | |
| DE | 102009021938 | A1 | 11/2010 | |
| DE | 102010007204 | A1 | 8/2011 | |
| DE | 102013214108 | A1 | 2/2015 | |
| DE | 102014116798 | A1 | 5/2016 | |
| EP | 0076924 | A2 | 4/1983 | |
| EP | 0316224 | A1 | 5/1989 | |
| EP | 0347049 | A2 | 12/1989 | |
| EP | 0418700 | A1 | 3/1991 | |
| EP | 0423698 | A1 | 4/1991 | |
| EP | 0525970 | A1 | 2/1993 | |
| EP | 0664210 | A1 | 7/1995 | |
| EP | 1013622 | A1 | 6/2000 | |
| EP | 1031409 | A1 | 8/2000 | |
| EP | 1046493 | A2 | 10/2000 | |
| EP | 0910721 | B1 | 11/2000 | |
| EP | 1647663 | A1 | 4/2006 | |
| EP | 2236281 | A1 | 10/2010 | |
| EP | 2385630 | A2 | 11/2011 | |
| EP | 2521118 | A2 | 11/2012 | |
| EP | 2852502 | A2 | 4/2015 | |
| EP | 2933718 | A1 | 10/2015 | |
| EP | 3093181 | A2 | 11/2016 | |
| EP | 3100854 | A1 | 12/2016 | |
| EP | 3118174 | A1 | 1/2017 | |
| EP | 3118175 | A1 | 1/2017 | |
| EP | 3144141 | A1 | 3/2017 | |
| EP | 3156286 | A1 | 4/2017 | |
| EP | 3189965 | A1 | 7/2017 | |
| EP | 3288791 | A1 | 3/2018 | |
| EP | 3426614 | A1 | 1/2019 | |
| EP | 3532442 | A1 | 9/2019 | |
| FR | 2750075 | A1 | 12/1997 | |
| FR | 2918411 | A1 | 1/2009 | |
| FR | 3012073 | A1 | 4/2015 | |
| GB | 0805770 | A | 12/1958 | |
| GB | 0991867 | A | 5/1965 | |
| GB | 1319846 | A | 6/1973 | |
| GB | 2011316 | A | 7/1979 | |
| GB | 2281542 | A | 3/1995 | |
| JP | 55-154329 | | 12/1980 | |
| JP | 57-048082 | A | 3/1982 | |
| JP | 58-073681 | A | 5/1983 | |
| JP | 58-194751 | | 11/1983 | |
| JP | 59-076561 | A | 5/1984 | |
| JP | 63-089317 | A | 4/1988 | |
| JP | 63-190730 | | 8/1988 | |
| JP | 03-059337 | U | 6/1991 | |
| JP | 3059337 | U | 6/1991 | |
| JP | 03-228840 | A | 10/1991 | |
| JP | 04-119931 | | 4/1992 | |
| JP | 05-116972 | A | 5/1993 | |
| JP | 06-340029 | A | 12/1994 | |
| JP | 10-218630 | A | 8/1998 | |
| JP | 11-001349 | A | 1/1999 | |
| JP | 11-006029 | A | 1/1999 | |
| JP | 11-060293 | A | 3/1999 | |
| JP | 2000-260330 | A | 9/2000 | |
| JP | 2002-255574 | A | 9/2002 | |
| JP | 2003-500260 | A | 1/2003 | |
| JP | 2003-276571 | A | 10/2003 | |
| JP | 2003-321257 | A | 11/2003 | |
| JP | 2004-101712 | A | 4/2004 | |
| JP | 2004-284839 | A | 10/2004 | |
| JP | 2006-181936 | A | 7/2006 | |
| JP | 2007-188035 | A | 7/2007 | |
| JP | 2007-197288 | A | 8/2007 | |
| JP | 2010-145731 | A | 7/2010 | |
| JP | 2012-111661 | A | 6/2012 | |
| JP | 2013-084269 | A | 5/2013 | |
| JP | 2014-126564 | A | 7/2014 | |
| JP | 2015-502901 | A | 1/2015 | |
| JP | 2015-092422 | A | 5/2015 | |
| JP | 5748082 | B2 | 7/2015 | |
| JP | 5796561 | B2 | 10/2015 | |
| JP | 2016-500458 | A | 1/2016 | |
| JP | 2016-031696 | A | 3/2016 | |
| JP | 2016-517380 | A | 6/2016 | |
| JP | 2016-130810 | A | 7/2016 | |
| JP | 2016-144008 | A | 8/2016 | |
| JP | 5976561 | B2 | 8/2016 | |
| JP | 2016-173794 | A | 9/2016 | |
| JP | 2016-530204 | A | 9/2016 | |
| JP | 2016-203609 | A | 12/2016 | |
| JP | 2016-207200 | A | 12/2016 | |
| JP | 6281825 | B2 | 2/2018 | |
| JP | 6281825 | B2 * | 2/2018 | ......... H01L 21/6831 |
| JP | 6340029 | B2 | 6/2018 | |
| KR | 2002-0019045 | A | 3/2002 | |
| KR | 10-0479282 | B1 | 8/2005 | |
| KR | 10-2008-0023888 | A | 3/2008 | |
| KR | 10-2013-0005776 | A | 1/2013 | |
| KR | 10-2014-0111403 | A | 9/2014 | |
| KR | 10-2015-0026911 | A | 3/2015 | |
| KR | 10-2015-0033969 | A | 4/2015 | |
| KR | 10-2015-0051458 | A | 5/2015 | |
| KR | 10-1550833 | B1 | 9/2015 | |
| KR | 1550833 | B1 * | 9/2015 | ............... G02F 1/13 |
| KR | 10-2015-0121101 | A | 10/2015 | |
| KR | 10-2016-0118746 | A | 10/2016 | |
| KR | 10-1674060 | B1 | 11/2016 | |
| KR | 10-2016-0144008 | A | 12/2016 | |
| KR | 10-2017-0000208 | A | 1/2017 | |
| KR | 10-2017-0106263 | A | 9/2017 | |

(56) References Cited

FOREIGN PATENT DOCUMENTS

| | | |
|---|---|---|
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | WO-2017155932 A1 * | 9/2017 ................. B60J 1/00 |
| WO | WO-2017218652 A1 * | 12/2017 ......... C03B 23/0258 |
| WO | 2018/005646 A1 | 1/2018 |
| WO | 2018/009504 A1 | 1/2018 |
| WO | 2018/015392 A1 | 1/2018 |
| WO | WO-2018005646 A1 * | 1/2018 ....... B29C 45/14065 |
| WO | WO-2018009504 A1 * | 1/2018 ............. B32B 17/06 |
| WO | 2018/075853 A1 | 4/2018 |
| WO | WO-2018075853 A1 * | 4/2018 ....... B29C 66/81463 |
| WO | 2018/081068 A1 | 5/2018 |
| WO | WO-2018081068 A1 * | 5/2018 ............. B32B 17/06 |
| WO | 2018/102332 A1 | 6/2018 |
| WO | 2018/125683 A1 | 7/2018 |
| WO | WO-2018129065 A2 * | 7/2018 ............. B32B 17/06 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

"Standard Test Method for Measurement of Glass Stress—Optical Coefficient", ASTM International, Designation C770-16, 2016.

Ashley Klamer, "Dead front overlays", Marking Systems, Inc., Jul. 8, 2013, 2 pages.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.

ASTM C1422/C1422M-10 "Standard Specification for Chemically Strengthened Flat Glass"; Downloaded Jan. 24, 2018; 5 pages.

ASTM Standard C770-98 (2013), "Standard Test Method for Measurement of Glass Stress-Optical Coefficient".

Burchardt et al., (Editorial Team), Elastic Bonding: The basic principles of adhesive technology and a guide to its cost-effective use in industry, 2006, 71 pages.

Byun et al; "A Novel Route for Thinning of LCD Glass Substrates"; SID 06 DIGEST; pp. 1786-1788, v37, 2006.

Datsiou et al., "Behaviour of cold bent glass plates during the shaping process", Engineered Transparency. International Conference atglasstec, Dusseldorf, Germany, Oct. 21 and 22, 2014, 9 pages.

Engineering ToolBox, "Coefficients of Linear Thermal Expansion", available online at <https://www.engineeringtoolbox.com/linear-expansion-coefficients-d_95.html>, 2003, 9 pages.

Fauercia "Intuitive HMI for a Smart Life on Board" (2018); 8 Pages http://www.faurecia.com/en/innovation/smart-life-board/intuitive-HMI.

Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].

Ferwerda et al., "Perception of sparkle in anti-glare display screens", Journal of the SID, vol. 22, Issue 2, 2014, pp. 129-136.

Galuppi et al; "Buckling Phenomena in Double Curved Cold-Bent Glass;" Intl. J. Non-Linear Mechanics 64 (2014) pp. 70-84.

Galuppi et al; "Large Deformations and Snap-Through Instability of Cold-Bent Glass" Challenging Glass 4 & Cost Action TU0905 Final Conference; (2014) pp. 681-689.

Galuppi L et al: "Optimal cold bending of laminated glass", 20070101 vol. 52, No. 1/2 Jan. 1, 2007 K2007-01-01), pp. 123-146.

Gollier et al., "Display Sparkle Measurement and Human Response", SID Symposium Digest of Technical Papers, vol. 44, Issue 1, 2013, pp. 295-297.

Indian Patent Application No. 201917031293 Office Action dated May 24, 2021; 6 pages; Indian Patent Office.

Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).

Li et al., "Effective Surface Treatment on the Cover Glass for Autointerior Applications", SID Symposium Digest of Technical Papers, vol. 47, 2016, pp. 467-469.

Pambianchi et al.; "Corning Incorporated: Designing a New Future With Glass and Optics" Chapter 1 In "Materials Research for Manufacturing: An Industrial Perspective of Turning Materials Into New Products"; Springer Series Material Science 224, p. 12 (2016).

(56) References Cited

OTHER PUBLICATIONS

Pegatron Corp. "Pegaton Navigate the Future"; Ecockpit/Center Cnsole Work Premiere Automotive World; Downloaded Jul. 12, 2017; 2 Pages.

Photodon, "Screen Protectors for Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).

Product Information Sheet: Coming® Gorilla® Glass 3 with Native Damage Resistance™, Corning Incorporated, 2015, Rev: F_090315, 2 pages.

Scholze, H., "Glass-Water Interactions", Journal of Non-Crystalline Solids vol. 102, Issues 1-3, Jun. 1, 1988, pp. 1-10.

Stattler; "New Wave—Curved Glass Shapes Design"; Glass Magazine; (2013); 2 Pages.

Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).

Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.

Zhixin Wang, Polydimethylsiloxane mechanical properties measured by macroscopic compression and nanoindentation techniques, Graduate Theses and Dissertations, University of South Florida, 2011, 79 pages.

Author Unknown; "Stress Optics Laboratory Practice Guide" 2012; 11 Pages.

Belis et al; "Cold Bending of Laminated Glass Panels"; Heron vol. 52 (2007) No. 1/2; 24 Pages.

Doyle et al; "Manual on Experimental Stress Analysis"; Fifth Edition, Society for Experimental Mechanics; Unknown Year; 31 Pages.

Elziere; "Laminated Glass: Dynamic Rupture of Adhesion"; Polymers; Universite Pierre Et Marie Curie—Paris VI, 2016. ENGLISH; 181 Pages.

Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.

Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.

Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.

Fildhuth et al; "Recovery Behaviour of Laminated Cold Bent Glass—Numerical Analysis and Testing"; Challenging Glass 4 & Cost Action TU0905 Final Conference—Louter, Bos & Beus (eds) (2014); 9 Pages.

Fildhuth; "Design and Monitoring of Cold Bent Lamination—Stabilised Glass"; ITKE 39 (2015) 270 Pages.

Galuppi et al; "Cold-Lamination-Bending of Glass: Sinusoidal is Better Than Circular", Composites Part B 79 (2015)285-300.

Galuppi et al; "Optical Cold Bending of Laminated Glass"; Internaitonal Journal of Solids and Structures, 67-68 (2015) pp. 231-243.

Millard; "Bending Glass in the Parametric Age"; Enclos; (2015); pp. 1-6; http://www.enclos.com/site-info/news/bending-glass-in-the-parametric-age.

Neugebauer et al; "Let Thin Glass in the Faade Move Thin Glass-New Possibilities for Glass in the Faade", Conference Paper Jun. 2018; 12 Pages.

Vakar et al; "Cold Bendable, Laminated Glass—New Possibilities in Design"; Structural Engineering International, Feb. 2004 pp. 95-97.

Weijde; "Graduation Plan"; Jan. 2017; 30 Pages.

Werner; "Display Materials and Processes," Information Display; May 2015; 8 Pages.

European Patent Application No. 20187179.5 European Search Report and Search Opinion dated Dec. 17, 2020; 7 Pages; European Patent Office.

\* cited by examiner

METHOD AND SYSTEM FOR COLD-FORMING GLASS

CROSS-REFERENCE TO RELATED APPLICATIONS

This application claims the benefit of priority under 35 U.S.C. § 119 of U.S. Provisional Application Ser. No. 62/880,820 filed on Jul. 31, 2019 the content of which is relied upon and incorporated herein by reference in its entirety.

BACKGROUND

The disclosure relates to vehicle interior systems including glass and methods for forming the same, and more particularly to vehicle interior systems including a curved glass article with a cold-formed or cold-bent cover glass and methods for forming the same.

Vehicle interiors include curved surfaces and can incorporate displays in such curved surfaces. The materials used to form such curved surfaces are typically limited to polymers, which do not exhibit the durability and optical performance as glass. As such, curved glass sheets are desirable, especially when used as covers for displays. Existing methods of forming such curved glass sheets, such as thermal forming, have drawbacks including high cost, optical distortion, and surface marking. Accordingly, Applicant has identified a need for vehicle interior systems that can incorporate a curved glass sheet in a cost-effective manner and without problems typically associated with glass thermal forming processes.

SUMMARY

According to an aspect, embodiments of the disclosure relate to a method of forming a curved glass article. In the method, a mold having a curved surface is provided. A self-adhesive layer is disposed on the curved surface. A glass sheet is bent into conformity with the curved surface at a temperature less than the glass transition temperature of the glass sheet. The glass sheet includes a first major surface and a second major surface in which the second major surface is opposite to the first major surface. The first major surface is adhered to the self-adhesive layer. A frame is bonded to the second major surface of the glass sheet, and the glass sheet is removed from the self-adhesive layer.

According to another aspect, embodiments of the disclosure relate to a system for cold-forming curved glass articles. The system includes a conveyor system, and a plurality of molds arranged on the conveyor system. Each of the plurality of molds comprising a curved surface and a self-adhesive layer. At a first position on the conveyor system, a first major surface of a glass sheet is adhered to the self-adhesive layer of one mold of the first plurality of molds. At a second position on the conveyor system, a frame is positioned on and adhered to a second major surface of the glass sheet. The second major surface is opposite to the first major surface. At a final position on the conveyor system, the glass sheet with bonded frame is removed from the mold. Between the second position and the final position, the conveyor system has a length and speed configured to allow curing of the frame adhered to the glass sheet.

According to still another aspect, embodiments of the disclosure relate to a mold for forming a curved glass article. The mold includes a curved surface and a self-adhesive layer disposed on the curved surface. The self-adhesive layer comprises at least one of a polyurethane, a silicone, an acrylic, a polyester, a polyolefin, a polyacrylamide, or a polyether-urethane copolymer. Further, the curved surface comprises at least one of a convex curvature or a concave curvature.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiments, examples of which are illustrated in the accompanying drawings. In general, a vehicle interior system may include a variety of different curved surfaces that are designed to be transparent, such as curved display surfaces and curved non-display glass covers, and the present disclosure provides articles and methods for forming these curved surfaces from a glass material. Forming curved vehicle surfaces from a glass material provide a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

Accordingly, as will be discussed in more detail below, Applicant has developed a glass article and related manufacturing processes that provide an efficient and cost effective way to form an article, such as a display for a vehicle interior system, utilizing a cold-bent glass sheet.

In particular embodiments, the curved glass article is formed by adhering a glass sheet to a curved mold using a self-adhesive layer. Thereafter, an adhesive is applied to either the bent glass sheet while on the mold or to the frame, and a frame is adhered to the bent glass sheet. The adhesive is allowed to cure while the glass is on the mold to bond the frame to the glass sheet to form the curved glass article. The curved glass article can be removed from the self-adhesive layer, and the mold can be reused for another molding process. In embodiments, a system for molding glass articles is provided. In the system, a plurality of molds is provided, which allows for multiple glass articles to be made and cured at the same time. In embodiments of the system, the actions of adhering the glass sheet to the mold and removing the glass article from the mold can be automated, e.g., the actions can be performed by robots while moving the plurality of molds around a conveyor system. Various aspects and advantages of the curved glass article and method of forming same will be described in relation to the exemplary embodiments described herein and shown in the figures.

Figure 1:
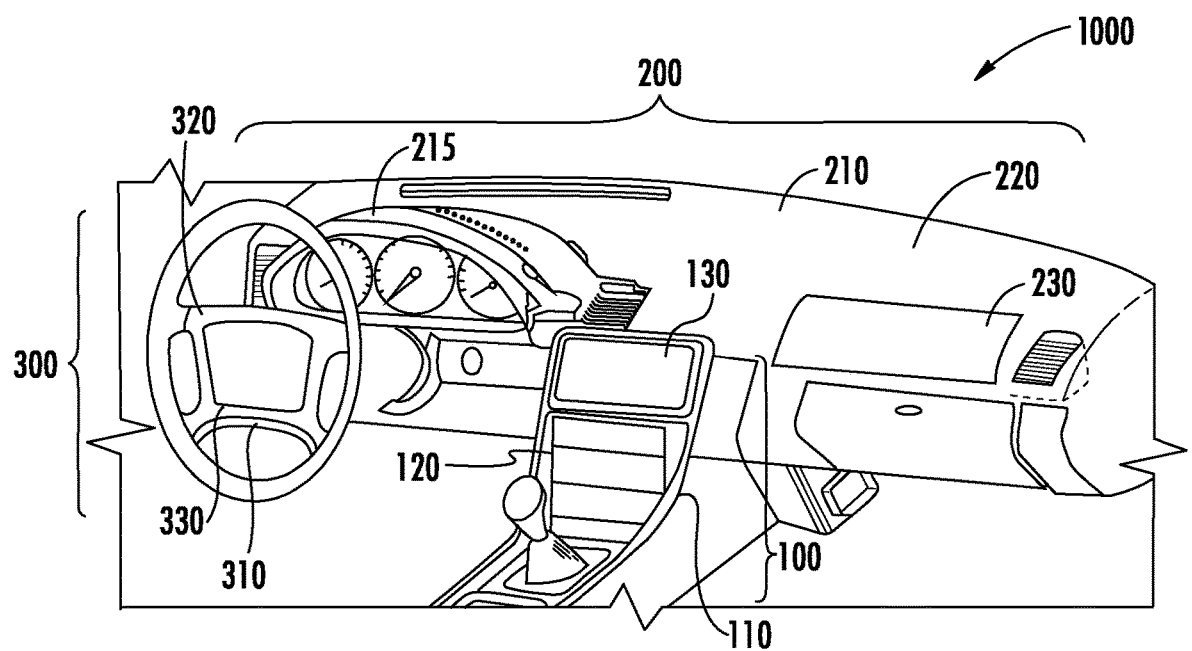
FIG. 1 is a perspective view of a vehicle interior with vehicle interior systems, according to exemplary embodiments.

FIG. 1 shows an exemplary vehicle interior 1000 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheelbase 310, with a curved surface 320 and a curved display 330. In one or more embodiments, the vehicle interior system includes a frame that is an arm rest, a pillar, a seat back, a floorboard, a headrest, a door panel, or any portion of the interior of a vehicle that includes a curved surface. In other embodiments, the frame is a portion of a housing for a free-standing display (i.e., a display that is not permanently connected to a portion of the vehicle). In embodiments, the display 130, 230, 330 may be at least one of a light-emitting diode display, an organic light-emitting diode display, a plasma display, or a liquid crystal display bonded to a rear surface (e.g., using an optically clear adhesive) of a curved glass article 10 disclosed herein.

The embodiments of the curved glass article described herein can be used in each of vehicle interior systems 100, 200 and 300. Further, the curved glass articles discussed herein may be used as curved cover glasses for any of the curved display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront functionality.

Figure 2A:
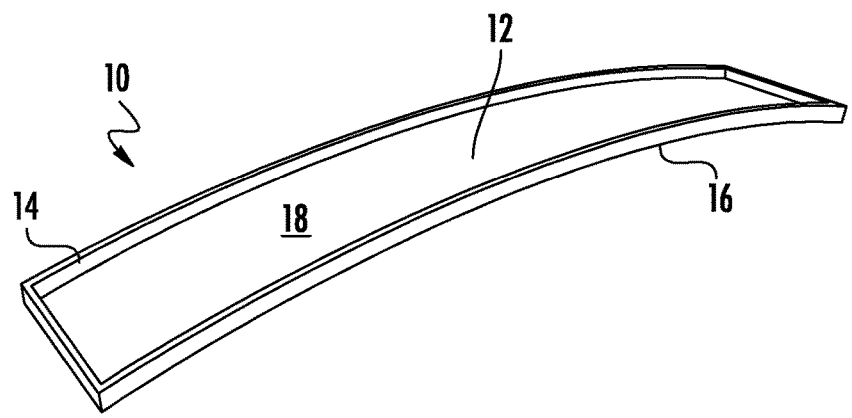
FIGS. 2A and 2B depict a curved glass article, according to an exemplary embodiment.

FIG. 2A depicts a curved glass article 10, such as the cover glass for curved display 130, 230, 330 according to exemplary embodiments. It should be understood that, while FIG. 2A is described in terms of forming curved display 130, 230, 330, the curved glass article 10 of FIG. 2A may be used in any suitable curved glass application, including any curved glass component of any of the vehicle interior systems of FIG. 1 or other curved glass surfaces of the vehicle interior 1000. Such curved glass components could be display or non-display regions, e.g., a flat display area and a curved non-display area, curved displays, and curved display and curved non-display areas.

Figure 2B:
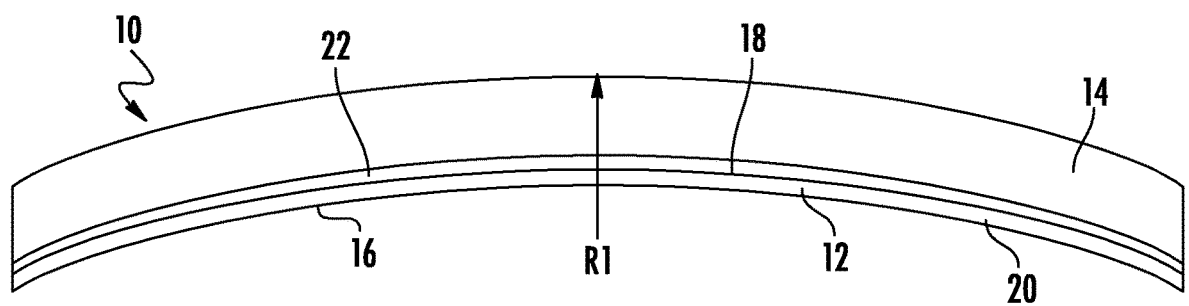
Figure 3:
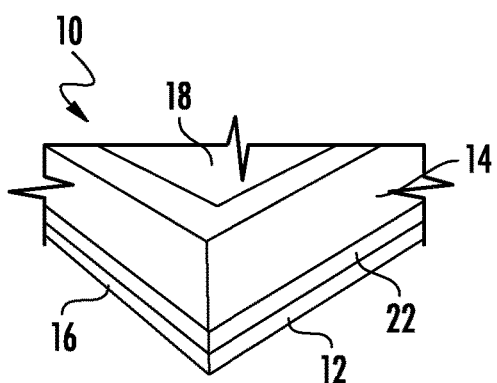
FIG. 3 depicts a close-up view of a corner of the curved glass article of FIG. 2A, according to an exemplary embodiment.

As shown in FIG. 2A, the curved glass article 10 includes a glass sheet 12 and a frame 14. The frame 14 holds the glass sheet 12 in a curved configuration. As shown in the side view of FIG. 2B, the glass sheet 12 includes a first major surface 16 and a second major surface 18 opposite first major surface 16. In embodiments, the second major surface 18 is a rear surface of the A minor surface 20 connects the first major surface 16 and the second major surface 18, and in specific embodiments, minor surface 20 defines the outer perimeter of glass sheet 12. The glass sheet 12 is attached to the frame 14 via an adhesive layer 22. As shown in the close-up view of FIG. 3, in embodiments, the adhesive layer 22 is applied only where the frame 14 is attached to the glass sheet 12.

The adhesive layer 22 provides long term strength after curing over the course of, e.g., about an hour at ambient temperature. In embodiments, exemplary adhesives for the adhesive layer 22 include toughened epoxy, flexible epoxy, acrylics, silicones, urethanes, polyurethanes, and silane modified polymers. In specific embodiments, the adhesive layer 22 includes one or more toughened epoxies, such as EP21TDCHT-LO (available from Masterbond®, Hackensack, N.J.), 3M™ Scotch-Weld™ Epoxy DP460 Off-White (available from 3M, St. Paul, Minn.). In other embodiments, the adhesive layer 22 includes one or more flexible epoxies, such as Masterbond EP21TDC-2LO (available from Masterbond®, Hackensack, N.J.), 3M™ Scotch-Weld™ Epoxy 2216 B/A Gray (available from 3M, St. Paul, Minn.), and 3M™ Scotch-Weld™ Epoxy DP125. In still other embodiments, the adhesive layer 22 includes one or more acrylics, such as LORD® Adhesive 410/Accelerator 19 w/LORD® AP 134 primer, LORD® Adhesive 852/LORD® Accelerator 25 GB (both being available from LORD Corporation, Cary, N.C.), DELO PUR SJ9356 (available from DELO Industrial Adhesives, Windach, Germany), Loctite® AA4800, Loctite® HF8000. TEROSON® MS 9399, and TEROSON® MS 647-2C (these latter four being available from Henkel AG & Co. KGaA, Dusseldorf, Germany), among others. In yet other embodiments, the adhesive layer 22 includes one or more urethanes, such as 3M™ Scotch-Weld™ Urethane DP640 Brown and 3M™ Scotch-Weld™ Urethane DP604, and in still further embodiments, the adhesive layer 22 includes one or more silicones, such as Dow Corning® 995 (available from Dow Corning Corporation, Midland, Mich.).

Returning to FIG. 2B, the glass sheet 12 has a curved shape such that first major surface 16 and second major surface 18 each include at least one curved section having a radius of curvature R1. In embodiments, R1 is between 30 mm and 5 m. Further, in embodiments, the glass sheet 12 has a thickness T1 (e.g., an average thickness measured between surfaces 16, 18) shown in FIG. 2B that is in a range from 0.05 mm to 2 mm. In specific embodiments, T1 is less than or equal to 1.5 mm and in more specific embodiments, T1 is 0.4 mm to 1.3 mm. Applicant has found that such thin glass sheets can be cold formed to a variety of curved shapes (including the relatively high curvature radii of curvature discussed herein) utilizing cold forming without breakage while at the same time providing for a high quality cover layer for a variety of vehicle interior applications. In addition, such thin glass sheets 12 may deform more readily, which could potentially compensate for shape mismatches and gaps that may exist relative to the frame 14.

In various embodiments, first major surface 16 and/or the second major surface 18 of glass sheet 12 includes one or more surface treatments or layers. The surface treatment may cover at least a portion of the first major surface 16 and/or second major surface 18. Exemplary surface treatments include anti-glare surfaces/coatings, anti-reflective surfaces/coatings, and an easy-to-clean surface coating/treatment. In one or more embodiments, at least a portion of the first major surface 16 and/or the second major surface 18 may include any one, any two or all three of an anti-glare surface, an anti-reflective surface, and easy-to-clean coating/treatment. For example, first major surface 16 may include an anti-glare surface and second major surface 18 may include an anti-reflective surface. In another example, first major surface 16 includes an anti-reflective surface and second major surface 18 includes an anti-glare surface. In yet another example, the first major surface 16 comprises either one of or both the anti-glare surface and the anti-reflective surface, and the second major surface 18 includes the easy-to-clean coating.

In embodiments, the glass sheet 12 may also include a pigment design on the first major surface 16 and/or second major surface 18. The pigment design may include any aesthetic design formed from a pigment (e.g., ink, paint and the like) and can include a wood-grain design, a brushed metal design, a graphic design, a portrait, or a logo. The pigment design may be printed onto the glass sheet. In one or more embodiments, the anti-glare surface includes an etched surface. In one or more embodiments, the anti-reflective surface includes a multi-layer coating.

Figure 4:
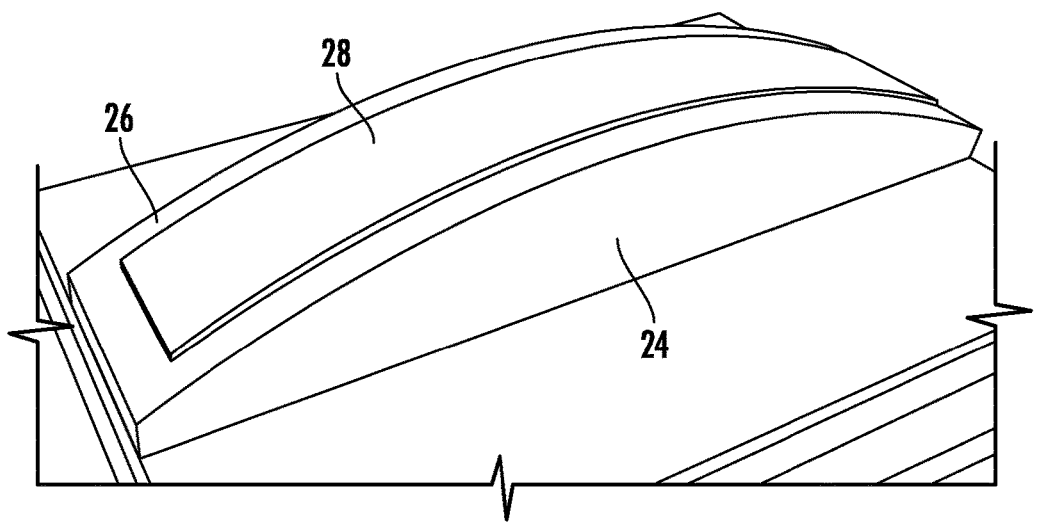
FIG. 4 depicts a mold with a self-adhesive layer for cold-forming a curved glass article, according to an exemplary embodiment.

In general, glass sheet 12 is cold formed or cold bent to the desired curved shape via application of a bending force to the glass sheet 12 while it is situated on a mold 24 as shown in FIG. 4. Advantageously, it is easier to apply surface treatments to a flat glass sheet 12 prior to creating the curvature in the glass sheet 12, and cold-forming allows the treated glass sheet 12 to be bent without destroying the surface treatment (as compared to the tendency of high temperatures associated with hot-forming to destroy surface treatments, which requires surface treatments to be applied to the curved article in a more complicated process). In embodiments, the cold forming process is performed at a temperature less than the glass transition temperature of the glass sheet 12. In particular, the cold forming process may be performed at room temperature (e.g., about 20° C.) or a slightly elevated temperature, e.g., at 200° C. or less, 150° C. or less, 100° C. or less, or at 50° C. or less.

Figure 5:
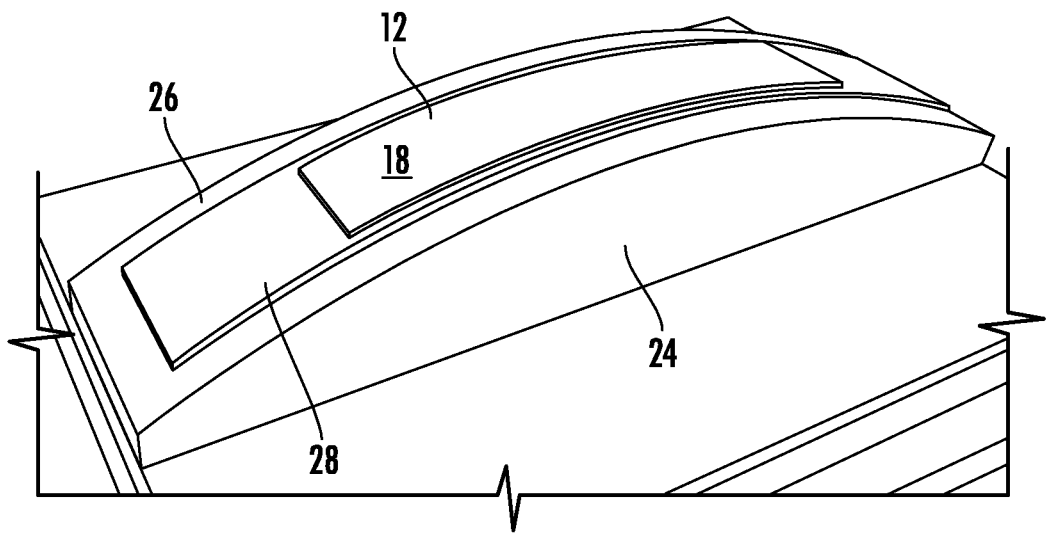
FIG. 5 depicts the mold of FIG. 4 with a glass sheet thereon, according to an exemplary embodiment.

The mold 24 includes a curved surface 26 on which a self-adhesive layer 28 is disposed. In embodiments, the self-adhesive layer 28 comprises integral surface layers having permanently tacky, pressure sensitive adhesive properties. In embodiments, the self-adhesive layer 28 provides an adhesive force via a surface interaction with the glass sheet 12 (e.g., Van der Waals force, suction force, etc.). Further, in embodiments, the adhesive force is between about 1 kgf/cm$^2$ and 10 kgf/cm$^2$, particularly about 5 kgf/cm$^2$. The adhesive layer 28 is configured to hold the glass sheet 12 in a bent configuration on the mold 24 such that the glass sheet 12 matches the curvature of the curved surface 26 of the mold. In particular, the first major surface 16 of the glass sheet 12 is adhered to the self-adhesive layer 28 as shown in FIG. 5.

In embodiments, the self-adhesive layer 28 comprises at least one of a polyurethane, a silicone, an acrylic, a polyester, a polyolefin, a polyacrylamide, or a polyether-urethane copolymer, among others. In embodiments, the integral surface layers having the tacky, pressure-sensitive adhesive properties may be formed by inhibiting cross-linking on the surface of the self-adhesive layer 28. Advantageously, glass sheets 12 can be repeatedly attached and detached from the self-adhesive layer 28, e.g., to cold-form multiple glass sheets 12 and frames 14 in succession. Further, in embodiments, the surface of the self-adhesive layer 28 can be cleaned and restored to its original state after becoming contaminated with, e.g., oil, dirt, or other debris by washing it with soapy water, acetone, or other suitable cleaning agents. In testing, certain embodiments of the self-adhesive layer 28 have not experienced any change in adhesion force after 33,000 uses, and in embodiments, the self-adhesive layer may be used for months at a time before needing replacement. However, the usable life of the self-adhesive layer may be dictated by a variety of factors, including working environment, cleanliness of the glass/mold, scratches or abrasions from surrounding machinery, etc. Also, advantageously, the self-adhesive layer 28 is strong enough to hold the glass sheet 12 in a bent configuration, but the glass sheet 12 can still be removed from the adhesive layer 28 when it is desired to remove the glass article 10 from the mold.

Figure 6:
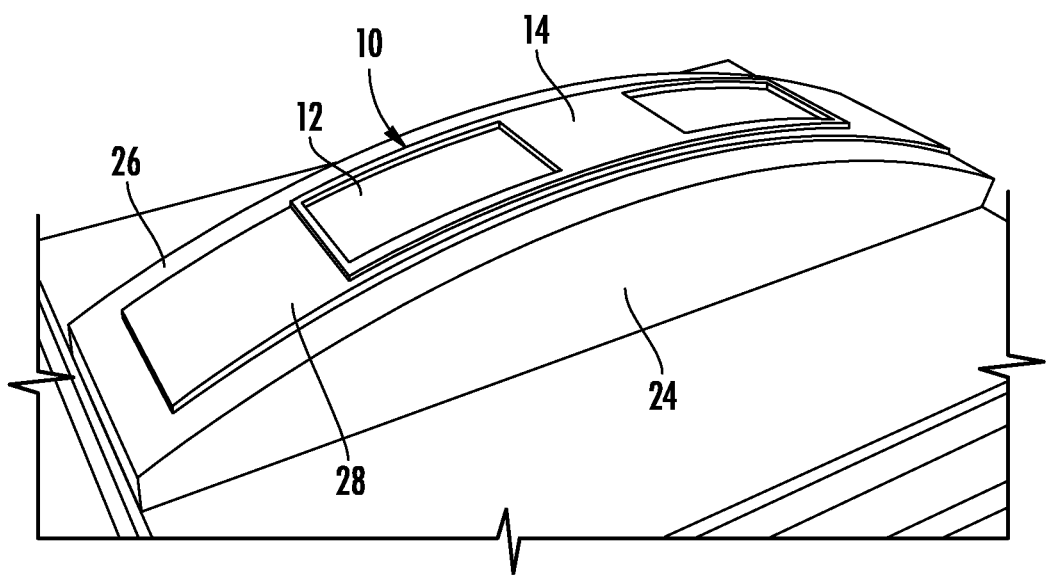
FIG. 6 depicts the mold of FIG. 4 with a glass sheet and frame thereon, according to an exemplary embodiment.

As shown in FIG. 6, the frame 14 is adhered to the second major surface 18 of the glass sheet 12. For example, in embodiments, the frame 14 may be coated with the adhesive layer 22 and then attached to the second major surface 18 of the glass sheet. Alternatively or additionally, in embodiments, the second major surface 18 is covered at least partially with the adhesive layer 22 for attaching the frame 14 to the glass sheet 12. After the frame 14 is adhered to the glass sheet 12, the glass article 10 may be allowed to cure on the mold 24 as necessary. Thereafter, the curved glass article 10 is released from the adhesive layer 28.

Figure 7:
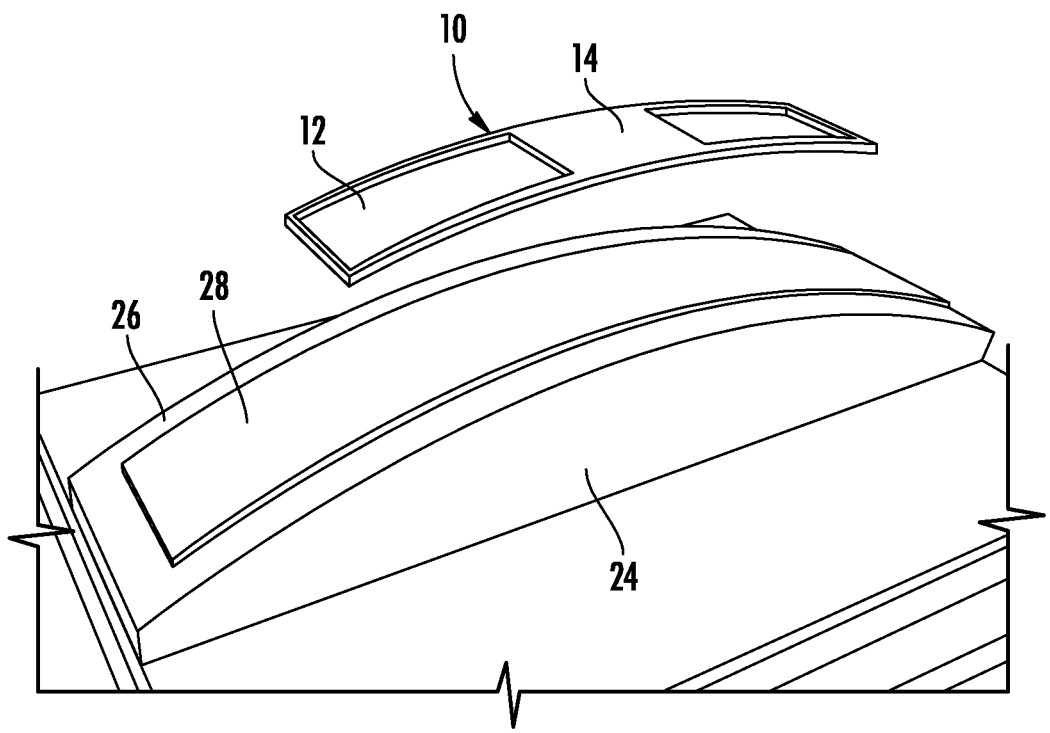
FIG. 7 depicts the mold of FIG. 4 with a curved glass article being released from the self-adhesive layer after the adhesive bonding the frame to the glass sheet has cured, according to an exemplary embodiment.
Figure 8:
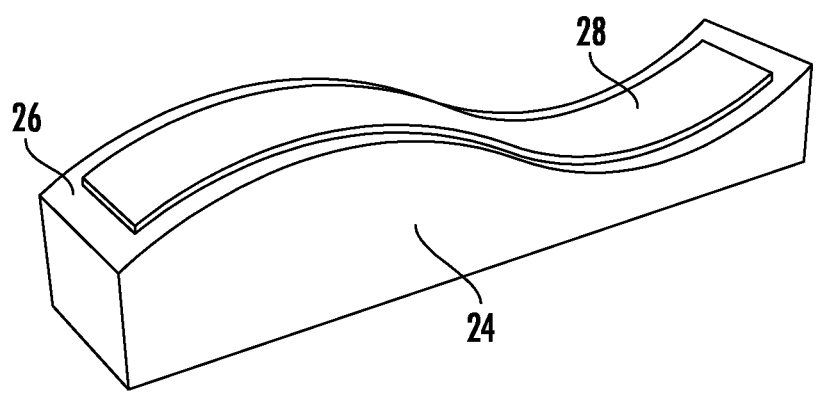
FIGS. 8 and 9 depict embodiments of molds having curvatures different from the mold shown in FIG. 4, according to exemplary embodiments.
Figure 9:
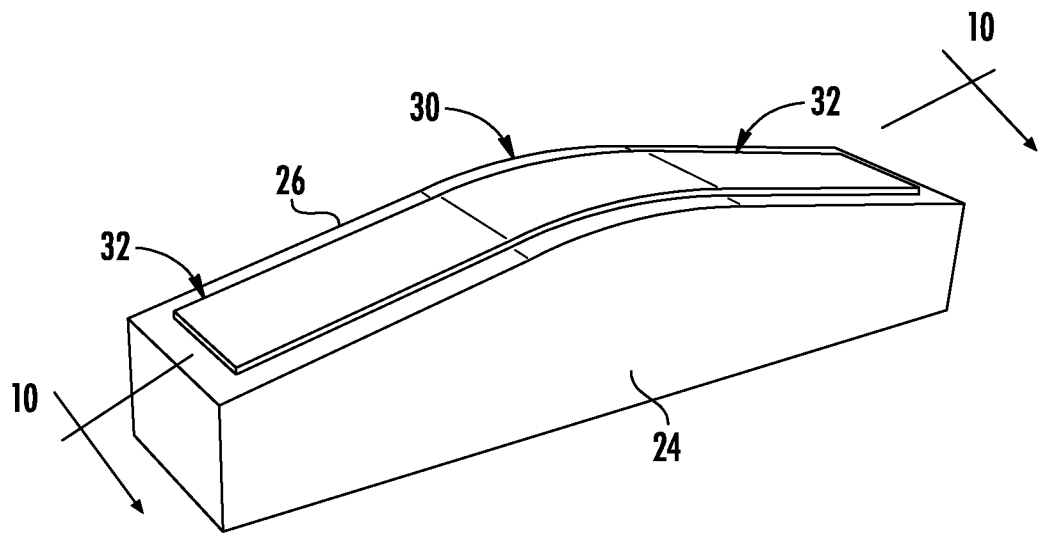

As can be seen in FIG. 7, the curved surface 26 of the mold 24 provides the glass article 10 with a convex curvature with respect to the first major surface 16. However, in other embodiments, the curved surface 26 of the mold 24 provides the glass sheet 12 with a concave curvature. In other embodiments, such as shown in FIG. 8, the mold 24 has a curved surface 26 that provides the glass sheet 12 with both a concave and a convex curvature. FIG. 9 depicts another embodiment of a mold 24 providing a V-shaped curved glass article 10. In particular, the curved surface 26 of the mold 24 has a curved section 30 and two flat sections 32. Thus, as opposed to the embodiments of the molds 24 shown in FIGS. 4-7 and FIG. 8 that have continuous curvatures, the mold 24 of FIG. 9 is only curved in the curved section 30, which is positioned between two flat sections 32.

Figure 10:
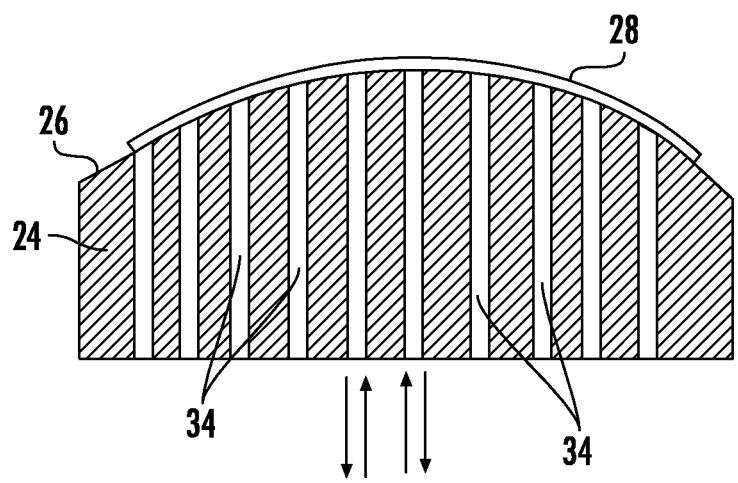
FIG. 10 depicts another embodiment of a mold having vacuum channels, according to an exemplary embodiment.

In the embodiment shown in FIG. 10, the mold 24 includes channels 34 through which air between the glass sheet 12 and the self-adhesive layer 28 can be evacuated by application of a negative pressure. That is, in such embodiments, the mold 24 utilizes both an adhesive layer 28 and vacuum pressure to hold the glass sheet 12 in conformity with the curved surface 26. In such embodiments, the channels 34 can also be used to help release the glass article 10 from the mold 24 by blowing air (or another fluid) towards the first major surface 16 of the glass sheet 12 to provide pressure pushing the glass sheet 12 away from the mold 24.

Figure 11:
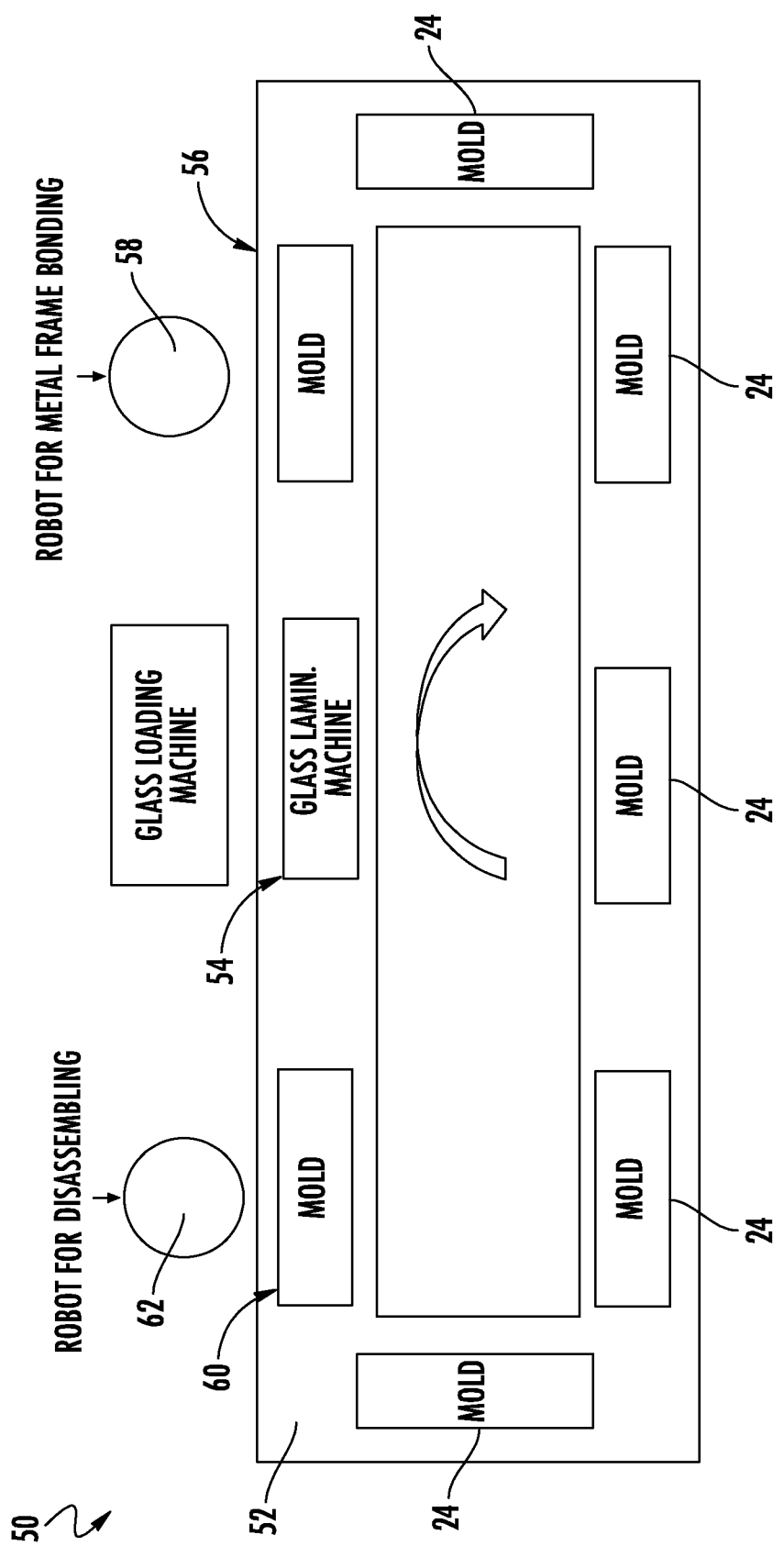
FIG. 11 depicts a system for cold-forming a glass sheet, according to an exemplary embodiment.

FIG. 11 schematically depicts an automated system 50 for cold-forming a plurality of curved glass articles 10. In the embodiment shown in FIG. 11, a plurality of molds 24 are provided on a conveyor system 52. At a first position 54, one of the plurality of molds 24 is laminated with a glass sheet 12. In embodiments, the glass sheets 12 may be stored in a glass loading machine that loads glass sheets 12 into a glass laminating machine that bends the glass sheet 12 over a self-adhesive layer 28 of a mold 24. At a second position 56, the frame 14 is bonded to the glass sheet 12. In embodiments, a robotic arm 58 can be used to position the frame 14 over the glass sheet 12, apply adhesive 22 to the glass sheet 12, and/or press the frame 14 onto the glass sheet 12. After the second position 56, the conveyor system 52 moves the molds 24 over a distance for a time sufficient to allow the adhesive layer 22 to cure, bonding the frame 14 to the glass sheet 12. In embodiments, the glass sheet 12 and frame 14 are allowed to cure on the mold 24 for a time of up to one hour. In embodiments, the adhesive layer 22 only bonds to an initial green strength on the conveyor system 52, instead of to a full cure strength, while on the conveyor system 52. The conveyor system 52 moves the molds 24 to a final position 60 where the curved glass article 10 is removed from the mold 24. In an embodiment, the curved glass article 10 is removed from the mold 24 with another robotic arm 62. In embodiments, a pin or diaphragm with air is used to push the curved glass article 10 from the mold 24. The mold 24 is then moved back to the first position 54 where another glass sheet 12 can be laminated to the mold 24, and the mold 54 cycles back around the conveyor system 52.

In various embodiments, glass sheet 12 is formed from a strengthened glass sheet (e.g., a thermally strengthened glass material, a chemically strengthened glass sheet, etc.) In such embodiments, when glass sheet 12 is formed from a strengthened glass material, first major surface 16 and second major surface 18 are under compressive stress, and thus second major surface 18 can experience greater tensile stress during bending to the convex shape without risking fracture. This allows for strengthened glass sheet 12 to conform to more tightly curved surfaces.

A feature of a cold-formed glass sheet 12 is an asymmetric surface compressive between the first major surface 16 and the second major surface 18 once the glass sheet 12 has been bent to the curved shape. In such embodiments, prior to the cold-forming process or being cold-formed, the respective compressive stresses in the first major surface 16 and the second major surface 18 of glass sheet 12 are substantially equal. After cold-forming, the compressive stress on concave first major surface 16 increases such that the compressive stress on the first major surface 16 is greater after cold-forming than before cold-forming. In contrast, convex second major surface 18 experiences tensile stresses during bending causing a net decrease in surface compressive stress on the second major surface 18, such that the compressive stress in the second major surface 18 following bending is less than the compressive stress in the second major surface 18 when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass sheets formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, easy-to-clean coating, etc.) are applied via deposition processes, such as sputtering processes that are typically ill-suited for coating curved glass articles. In addition, many surface treatments (e.g., anti-glare coatings, anti-reflective coatings, easy-to-clean coating, etc.) also are not able to survive the high temperatures associated with hot-bending processes. Thus, in particular embodiments discussed herein, one or more surface treatments are applied to the first major surface 16 and/or to the second major surface 18 of glass sheet 12 prior to cold-bending, and the glass sheet 12 including the surface treatment is bent to a curved shape as discussed herein. Thus, Applicant believes that the processes and systems discussed herein allow for bending of glass after one or more coating materials have been applied to the glass, in contrast to typical hot-forming processes.

In various embodiments, a cold-formed glass sheet 12 may have a compound curve including a major radius and a cross curvature. A complexly curved cold-formed glass sheet 12 may have a distinct radius of curvature in two independent directions. According to one or more embodiments, a complexly curved cold-formed glass sheet 12 may thus be characterized as having "cross curvature," where the cold-formed glass sheet 12 is curved along an axis (i.e., a first axis) that is parallel to a given dimension and also curved along an axis (i.e., a second axis) that is perpendicular to the same dimension. The curvature of the cold-formed glass sheet and the curved display can be even more complex when a significant minimum radius is combined with a significant cross curvature, and/or depth of bend. In various embodiments, glass sheet 12 can have more than two curved regions with the same or differing curved shapes. In some embodiments, glass sheet 12 can have one or more region having a curved shape with a variable radius of curvature.

Figure 12:
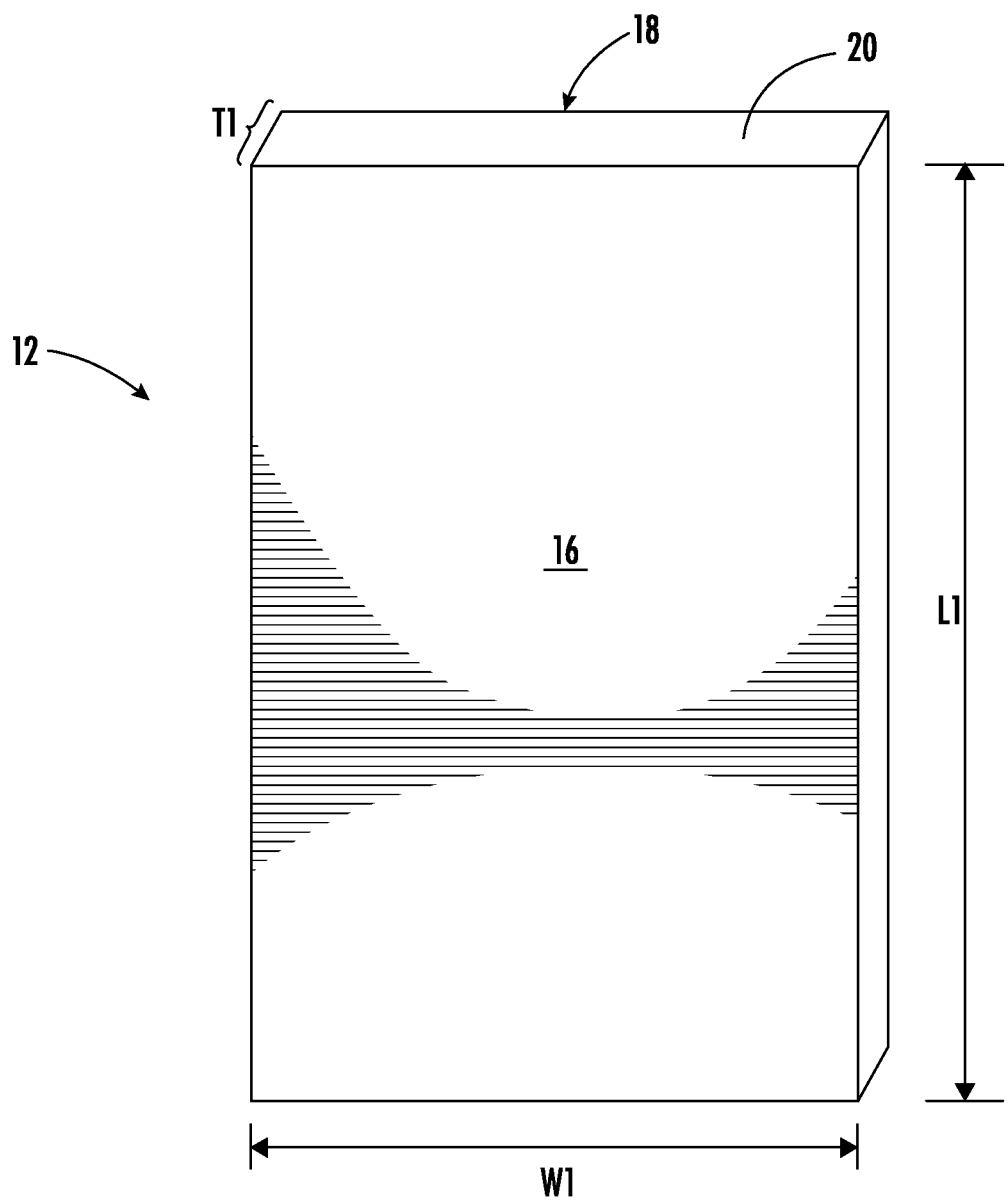
FIG. 12 depicts a glass sheet with exemplary dimensions, according to an exemplary embodiment.

Referring to FIG. 12, additional structural details of glass sheet 12 are shown and described. As noted above, glass sheet 12 has a thickness T1 that is substantially constant and is defined as a distance between the first major surface 16 and the second major surface 18. In various embodiments, T1 may refer to an average thickness or a maximum thickness of the glass sheet. In addition, glass sheet 12 includes a width W1 defined as a first maximum dimension of one of the first or second major surfaces 16, 18 orthogonal to the thickness T1, and a length L1 defined as a second maximum dimension of one of the first or second major surfaces 16, 18 orthogonal to both the thickness and the width. In other embodiments, W1 and L1 may be the average width and the average length of glass sheet 12, respectively.

In various embodiments, thickness T1 is 2 mm or less and specifically is 0.3 mm to 1.1 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, one or more radius of curvature (e.g., R1 shown in FIG. 2B) of glass sheet 12 is about 30 mm or greater. For example, R1 may be in a range from about 30 mm to about 5000 mm, from about 50 mm to about 5000 mm, from about 70 mm to about 5000 mm, from about 90 mm to about 5000 mm, from about 110 mm to about 5000 mm, from about 150 mm to about 5000 mm, from about 200 mm to about 5000 mm, from about 250 mm to about 5000 mm, from about 300 mm to about 5000 mm, from about 350 mm to about 5000 mm, from about 400 mm to about 5000 mm, from about 450 mm to about 5000 mm, from about 500 mm to about 5000 mm, from about 550 mm to about 5000 mm, from about 600 mm to about 5000 mm, from about 650 mm to about 5000 mm, from about 700 mm to about 5000 mm, from about 750 mm to about 5000 mm, from about 800 mm to about 5000 mm, from about 850 mm to about 5000 mm, from about 900 mm to about 5000 mm, from about 950 mm to about 5000 mm, from about 1000 mm to about 5000 mm, from about 1500 mm to about 5000 mm, from about 2000 mm to about 5000 mm, from about 2500 mm to about 5000 mm, from about 3000 mm to about 5000 mm, from about 3500 mm to about 5000 mm, from about 4000 mm to about 5000 mm, from about 4500 mm to about 5000 mm, from about 30 mm to about 4500 mm, from about 30 mm to about 4000 mm, from about 30 mm to about 3500 mm, from about 30 mm to about 3000 mm, from about 30 mm to about 2500 mm, from about 30 mm to about 2000 mm, from about 30 mm to about 1500 mm, from about 30 mm to about 1000 mm, from about 30 mm to about 950 mm, from about 30 mm to about 900 mm, from about 30 mm to about 850 mm, from about 30 mm to about 800 mm, from about 30 mm to about 750 mm, from about 30 mm to about 700 mm, from about 30 mm to about 650 mm, from about 30 mm to about 600 mm, from about 30 mm to about 550 mm, from about 30 mm to about 500 mm, from about 30 mm to about 450 mm, or from about 30 mm to about 400 mm. In other embodiments, R1 falls within any one of the exact numerical ranges set forth in this paragraph.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass sheet 12 may be strengthened. In one or more embodiments, glass sheet 12 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 12 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 12 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., $Na^+$ and $K^+$) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T1 of the glass sheet (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm. In other embodiments, DOC falls within any one of the exact numerical ranges set forth in this paragraph.

In one or more embodiments, the strengthened glass sheet may have a CS (which may be found at the surface or a depth within the glass sheet) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass sheet may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass sheet 12 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 134 may be made from any glass composition falling with any one of the exact numerical ranges discussed above.

Aspect (1) of this disclosure pertains to a method of forming a curved glass article, comprising the steps of: providing a mold comprising a curved surface, wherein a self-adhesive layer is disposed on the curved surface; bending a glass sheet into conformity with the curved surface at a temperature less than the glass transition temperature of the glass sheet, wherein the glass sheet comprises a first major surface and a second major surface, wherein the second major surface is opposite to the first major surface, and wherein the first major surface is adhered to the self-adhesive layer; bonding a frame to the second major surface of the glass sheet; and removing the glass sheet from the self-adhesive layer. In one or more embodiments, Aspect (1) pertains to a method of forming a curved glass article, comprising the steps of: bending a glass sheet at a temperature less than the glass transition temperature of the glass sheet to confirm with a curved surface of a mold comprising a self-adhesive layer disposed on the curved surface, wherein the glass sheet comprises a first major surface and a second major surface, wherein the second major surface is opposite to the first major surface, and wherein the first major surface is adhered to the self-adhesive layer; bonding a frame to the second major surface of the glass sheet; and removing the glass sheet from the self-adhesive layer.

Aspect (2) pertains to the method of Aspect (1), wherein bonding further comprising applying an adhesive to the frame or to the second major surface of the glass sheet, positioning the frame on the second major surface, and curing the adhesive.

Aspect (3) pertains to the method of Aspect (2), wherein the adhesive comprises at least one of a toughened adhesive, a flexible epoxy, an acrylic, a urethane, or a silicone.

Aspect (4) pertains to the method of any one of Aspects (1) through (3), wherein the self-adhesive layer comprises at least one of a polyurethane, a silicone, an acrylic, a polyester, a polyolefin, a polyacrylamide, or a polyether-urethane copolymer.

Aspect (5) pertains to the method of any one of Aspects (1) through (4), wherein the curved surface comprises at least one of a convex curvature or a concave curvature Aspect (6) pertains to the method of any one of Aspects (1) through (5), wherein the curved surface comprises both a convex curvature and a concave curvature.

Aspect (7) pertains to the method of any one of Aspects (1) through (6), wherein the curved surface has a radius of curvature of from 30 mm to 5 m.

Aspect (8) pertains to the method of any one of Aspects (1) through (7), wherein bending takes place at a temperature of less than 200° C.

Aspect (9) pertains to the method of any one of Aspects (1) through (8), wherein the mold further comprises a plurality of vacuum channels and wherein the method further comprises applying a negative pressure to the first major surface of the glass sheet to keep the glass sheet in conformity with the curved surface.

Aspect (10) pertains to the method of Aspect (9), wherein releasing the glass sheet from the self-adhesive layer further comprising applying a positive pressure to the first major surface to push the glass sheet away from the self-adhesive layer.

Aspect (11) pertains to the method of any one of Aspects (1) through (10), wherein the glass sheet has a thickness between the first major surface and the second major surface of from 0.4 mm to 2.0 mm.

Aspect (12) pertains to the method of any one of Aspects (1) through (11), further comprising bonding a display to the second major surface using optically clear adhesive.

Aspect (13) pertains to the method of Aspect (12), wherein the display comprises at least one of a light-emitting diode display, an organic light-emitting diode display, a plasma display, or a liquid crystal display.

Aspect (14) pertains to the method of any one of Aspects (1) through (13), wherein the glass sheet comprises at least one of soda lime glass, aluminosilicate glass, borosilicate glass, boroaluminosilicate glass, alkali-containing aluminosilicate glass, alkali-containing borosilicate glass, and alkali-containing boroaluminosilicate glass.

Aspect (15) pertains to the method of any one of Aspects (1) through (14), wherein the first major surface and the second major surface are chemically strengthened.

Aspect (16) pertains to the method of any one of Aspects (1) through (15), further comprising applying a surface treatment to at least one of the first major surface or the second major surface prior to bending.

Aspect (17) pertains to the method of Aspect (16), wherein the surface treatment is at least one of an anti-glare treatment, an anti-reflective coating, and easy-to-clean coating.

Aspect (18) pertains to a system for cold-forming curved glass articles, comprising: a conveyor system; a plurality of molds arranged on the conveyor system, each of the plurality of molds comprising a curved surface and a self-adhesive layer; wherein at a first position on the conveyor system, a first major surface of a glass sheet is adhered to the self-adhesive layer of one mold of the first plurality of molds; wherein at a second position on the conveyor system, a frame is positioned on and adhered to a second major surface of the glass sheet, wherein the second major surface is opposite to the first major surface; wherein at a final position on the conveyor system, the glass sheet with bonded frame is removed from the mold; and wherein between the second position and the final position, the conveyor system has a length and speed configured to allow curing of the frame adhered to the glass sheet.

Aspect (19) pertains to the system of Aspect (18), wherein the self-adhesive layer comprises at least one of polyurethane, a silicone, an acrylic, a polyester, a polyolefin, a polyacrylamide, or a polyether-urethane copolymer.

Aspect (20) pertains to the system of Aspect (18) or Aspect (19), wherein the curved surface comprises at least one of a convex curvature or a concave curvature Aspect (21) pertains to the system of anyone of Aspects (18) through (20), wherein the curved surface comprises both a convex curvature and a concave curvature.

Aspect (22) pertains to the system of anyone of Aspects (18) through (21), wherein the curved surface has a radius of curvature of from 30 mm to 5 m.

Aspect (23) pertains to the system of anyone of Aspects (18) through (22), wherein the system is operated at a temperature of less than 200° C.

Aspect (24) pertains to the system of anyone of Aspects (18) through (23), wherein the second position comprises a first robotic arm configured to position the frame on the second surface of the glass sheet.

Aspect (25) pertains to the system of anyone of Aspects (18) through (24), wherein the final position comprises a second robotic arm configured to remove the glass sheet with bonded frame from the self-releasing adhesive layer of the mold.

Aspect (26) pertains to the system of anyone of Aspects (18) through (24), further comprising a vacuum system configured to apply a negative pressure to a glass sheet adhered to the self-adhesive layer through a plurality of vacuum channels formed into at least one of the plurality of molds.

Aspect (27) pertains to the system of Aspect (26), wherein the vacuum system is also configured to apply a positive pressure to a glass sheet to facilitate releasing the glass sheet from the self-adhesive layer at the final position.

Aspect (28) pertains to a mold for forming a curved glass article, the mold comprising: a curved surface; and a self-adhesive layer disposed on the curved surface; wherein the self-adhesive layer comprises at least one of a polyurethane, a silicone, an acrylic, a polyester, a polyolefin, a polyacrylamide, or a polyether-urethane copolymer; and wherein the curved surface comprises at least one of a convex curvature or a concave curvature.

Aspect (29) pertains to the system of Aspect (28), wherein the curved surface comprises both a convex curvature and a concave curvature.

Aspect (30) pertains to the system of Aspect (28) or Aspect (29), wherein the curved surface has a radius of curvature of from 30 mm to 5 m.

Aspect (31) pertains to the system of anyone of Aspects (28) through (30), further comprising vacuum channels formed into the mold, wherein the vacuum channels are configured to allow a positive or negative pressure to be applied to a glass sheet.

Aspect (32) pertains to the system of anyone of Aspects (28) through (31), wherein the self-adhesive layer has an adhesion force of from 1 kgf/cm$^2$ to 10 kgf/cm$^2$.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming a curved glass article comprising:
bending a glass sheet at a temperature less than the glass transition temperature of the glass sheet to conform with a curved surface of a mold comprising a self-adhesive layer disposed on the curved surface, wherein the glass sheet comprises a first major surface and a second major surface, wherein the second major surface is opposite to the first major surface, and wherein the first major surface is adhered to the self-adhesive layer, wherein the self-adhesive layer holds the glass sheet in a bent configuration;
bonding a frame to the second major surface of the glass sheet;
removing the glass sheet from the self-adhesive layer;
wherein the self-adhesive layer provides an adhesive force via surface interaction with the glass sheet, wherein the adhesive force is between about 1 kgf/cm$^2$ and 10 kgf/cm$^2$.

2. The method of claim 1, wherein bonding further comprising applying an adhesive to the frame or to the second major surface of the glass sheet, positioning the frame on the second major surface, and curing the adhesive.

3. The method of claim 2, wherein the adhesive comprises at least one of a toughened adhesive, a flexible epoxy, an acrylic, a urethane, or a silicone.

4. The method of claim 1, wherein the self-adhesive layer comprises at least one of a polyurethane, a silicone, an acrylic, a polyester, a polyolefin, a polyacrylamide, or a polyether-urethane copolymer.

5. The method of claim 1, wherein the curved surface comprises at least one of a convex curvature, a concave curvature, and both a convex curvature and a concave curvature.

6. The method of claim 1, wherein the curved surface has a radius of curvature of from 30 mm to 5 m.

7. The method of claim 1, wherein bending takes place at a temperature of less than 200° C.

8. The method of claim 1, wherein the glass sheet has a thickness between the first major surface and the second major surface from 0.4 mm to 2.0 mm.

9. The method of claim 1, further comprising bonding a display to the second major surface using an optically clear adhesive.

10. The method of claim 9, wherein the display comprises at least one of a light-emitting diode display, an organic light-emitting diode display, a plasma display, or a liquid crystal display.

11. The method of claim 1, wherein the first major surface and the second major surface are chemically strengthened.

* * * * *

UNITED STATES PATENT AND TRADEMARK OFFICE
CERTIFICATE OF CORRECTION

PATENT NO. : 11,685,685 B2  
APPLICATION NO. : 16/944685  
DATED : June 27, 2023  
INVENTOR(S) : Dongyoung Cho et al.

Page 1 of 1

It is certified that error appears in the above-identified patent and that said Letters Patent is hereby corrected as shown below:

On the Title Page

On the page 5, in Column 2, item (56) under "Other Publications", Line 20, delete "atglasstec," and insert -- at glasstec, --.

On the page 5, in Column 2, item (56) under "Other Publications", Line 40, delete "K2007-01-01)," and insert -- (2007-01-01), --.

On the page 6, in Column 1, item (56) under "Other Publications", Line 1, delete ""Pegaton" and insert -- "Pegatron --.

On the page 6, in Column 1, item (56) under "Other Publications", Line 2, delete "Cnsole" and insert -- Console --.

On the page 6, in Column 1, item (56) under "Other Publications", Line 8, delete "Coming®" and insert -- Corning® --.

On the page 6, in Column 2, item (56) under "Other Publications", Line 21, delete "Internaitonal" and insert -- International --.

On the page 6, in Column 2, item (56) under "Other Publications", Line 26, delete "Faade" and insert -- Facade --.

On the page 6, in Column 2, item (56) under "Other Publications", Line 27, delete "Faade"" and insert -- Facade" --.

Signed and Sealed this  
Second Day of January, 2024

Katherine Kelly Vidal  
*Director of the United States Patent and Trademark Office*